United States Patent [19]
Fletcher et al.

[11] 3,859,119
[45] Jan. 7, 1975

[54] METHOD OF PRODUCING A STORAGE BULB FOR AN ATOMIC HYDROGEN MASER

[76] Inventors: James C. Fletcher, Administrator of the National Aeronautics and Space Administration with respect to an invention of; Hubert Erpenbach, 315 Manford Way, Pasadena, Calif. 91105

[22] Filed: Dec. 22, 1972

[21] Appl. No.: 317,567

[52] U.S. Cl. .......................... 117/97, 117/95, 330/4, 332/7.5
[51] Int. Cl. ......................... C03c 17/00, H01s 1/00
[58] Field of Search ............ 117/95, 97, 96, 132 CF; 330/4; 332/7.5

[56] References Cited
UNITED STATES PATENTS

| | | | |
|---|---|---|---|
| 3,008,601 | 11/1961 | Cahne | 117/132 CF |
| 3,051,683 | 8/1962 | Mallouk | 260/890 |
| 3,502,498 | 3/1970 | Petriello et al. | 117/132 CF |
| 3,510,337 | 5/1970 | Katzer et al. | 117/132 CF |

*Primary Examiner*—William D. Martin
*Assistant Examiner*—Stuart D. Frenkel
*Attorney, Agent, or Firm*—Monte F. Mott; John R. Manning; Wilfred Grifka

[57] ABSTRACT

A storage bulb for an atomic hydrogen maser is produced by coating its internal surface with an emulsion containing both TFE and FEP particles. The emulsion is produced by mixing a first quantity of TFE in an aqueous dispersion with a second quantity of FEP in an aqueous dispersion, with a third quantity of distilled water. The emulsion is poured into the bulb to coat it uniformly so as to form a thin film of emulsion on the bulb's internal surface. After excess emulsion is drained out of the bulb the emulsion in the bulb is dried to remove the water and most of the aqueous matter therefrom. The remaining emulsion is then cured by heating the bulb to a temperature of at least 380°C.

2 Claims, 1 Drawing Figure

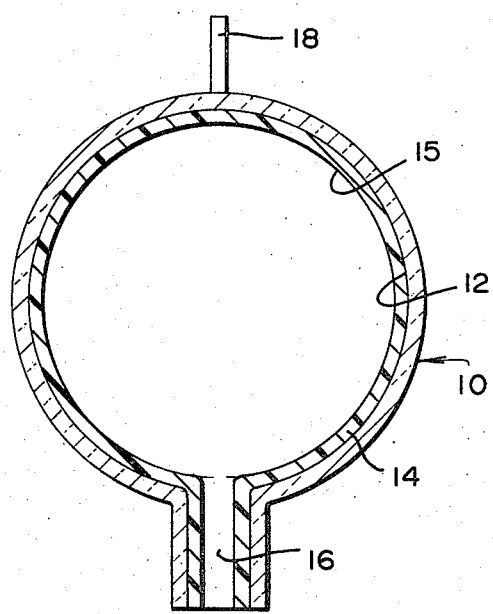

METHOD OF PRODUCING A STORAGE BULB FOR AN ATOMIC HYDROGEN MASER

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention generally relates to an atomic hydrogen maser and, more particularly, to a method of coating the inside surface of the storage bulb in an atomic hydrogen maser.

2. Description of the Prior Art

The use of the atomic hydrogen maser as a highly stable frequency source is well known. It is also well known that the maser's performance greatly depends on the properties of the interior surface of the maser's storage bulb in which the hydrogen atoms are temporarily stored. The surface must be extremely uniformly smooth and free of any imperfections, such as occasional pinholes, which often trap atoms which strike the surface, surface crazing also represents a severe imperfection. These imperfections result in loss of hydrogen maser output power. Also, they are believed to be the cause for long start-up delays.

Since the early development of the atomic hydrogen maser, various materials have been used to coat the bulb's interior surface in order to produce the required high degree of surface uniformity. In recent years, different types of fluorinated resins, which are commercially available under the Trademark Teflon, have been experimented with in coating storage bulbs.

As is known, Teflon is a mark which applies to tetrafluoroethylene (TFE) fluorocarbon resins, as well as, to fluorinated ethylene-propylene (FEP) resins which are available in an aqueous dispersion. As far as is known from familiarity with the pertinent literature and from unpublished studies and experiments performed by others, herebefore only one or the other of these type resins have been used in coating any one bulb.

Experience with TFE indicates that it produces a crystalline platelet structure whereby the surface is very smooth at the tops of the platelets. However, some pinholes or gaps are sometimes present between platelets. Thus, surface crazing is experienced. Also, when TFE is used, long cooling periods are required. Experience with FEP indicates that it is easier to handle than TFE. However, the latter produces a surface which is often not sufficiently smooth for atomic hydrogen maser applications.

Some designers have felt that the TFE fluorocarbon resin produces superior results, while others have regarded bulbs coated with fluorinated FEP resins as superior. However, even though bulbs coated with either of these resins have been found to provide significant improvements over those coated with different materials, previously used, they are not as satisfactory as hoped for. Coating a bulb with either of these resins is a most sensitive and difficult task. Even under optimum processing conditions, the ratio of rejected to acceptable bulbs is quite high. Since the cost of each bulb is high, having to produce bulbs which are unacceptable is most undesirable. Some attempts have been made to increase the number of acceptable bulbs by repeated coatings, which increase the time and cost of bulb production. These attempts have met with only limited success.

Another disadvantage of storage bulbs coated with either TFE or FEP is the relatively long maser start up time and the limited power output. A need therefore exists for a storage bulb with improved surface characteristics than those attainable by prior art techniques. Particularly, a need exists for a technique for producing the desired surface characteristics in a storage bulb for use in an atomic hydrogen maser.

OBJECTS AND SUMMARY OF THE INVENTION

It is a primary object of the present invention to provide a new method of producing coated storage bulbs for use in atomic hydrogen masers.

Another object of the invention is the provision of a new method of coating a storage bulb to produce a highly uniform smooth surface.

A further object of the present invention is to provide a new method for coating a storage bulb for use in an atomic hydrogen maser, whereby time delay in maser start-up time is minimized.

Yet a further object of the invention is to produce a storage bulb for an atomic hydrogen maser, with the bulb's internal surface coated to have a highly uniform surface and one which minimizes maser start-up time.

These and other objects of the invention are achieved by coating the storage bulb with a solution which contains a mixture of particles of tetrafluoroethylene hereafter referred to as TFE, and hexafluoropropylene-tetrafluoroethylene copolymer hereafter referred to as FEP, in lieu of either used singly.

The novel features of the invention are set forth with particularity in the appended claims. The invention will best be understood from the following description when read in conjunction with the accompanying drawing.

BRIEF DESCRIPTION OF THE DRAWING

The drawing is a cross-sectional view of a storage bulb coated in accordance with the present invention.

DESCRIPTION OF THE PREFERRED EMBODIMENTS

In accordance with the teaching of the present invention, coating of a storage bulb for use in an atomic hydrogen maser is accomplished by mixing TFE and FEP particles which are available as separate aqueous disperions containing wetting agents with a quantity of distilled water to form a fine, homogeneous emulsion or solution. The solution is poured into the bulb after the interior surface of the bulb has been cleaned thoroughly. After the emulsion is poured, the bulb is slowly rotated to insure complete coverage of its surface. Then the bulb is drained of excess solution and dried, such as by means of dry air, to vaporize the water. Then the particles on the bulb surface are cured in an oven at a sufficiently high temperature, e.g., 400°C to form a hard film with a very uniform and smooth surface on the bulb surface. During curing the wetting agents are vaporized at a temperature of at least 200°C.

Unusual and completely unexpected results have been achieved when coating a bulb with the solution of TFE and FEP, as compared with the results achieved when the bulb is coated with only either type particles, as was done in the prior art. The solution containing the TFE and FEP particles is easily applicable to the bulb to produce complete surface coverage. While rotating the bulb to insure complete coverage, it is important to prevent bubbles from being formed in the solution. This is accomplished by slowly and uniformly rotating the bulb without shaking it.

It has been discovered that it is much easier to completely coat the bulb surface to a high degree of uniformity with a solution containing both TFE and FEP particles rather than with one containing only one type of particles. After draining the bulb from excess solution, drying it to vaporize the excess water and curing the remaining particles, and extremely thin film of about 1.0 mil thick remains on the bulb surface. The film surface is highly uniform with very few if any pinholes or other imperfections. The film surface resists crazing thereby allowing optimum conditions for maser start-up with little or no time delay. Also, higher output power is attained.

The novel solution is produceable from commercially available particles in aqueous dispersions. For example, the TFE is available as a DuPont TFE-fluorocarbon aqueous dispersion. The FEP is also available from DuPont as Teflon 120 FEP-fluorocarbon resin dispersion.

In one application actually reduced to practice the solution used for bulb coating consists of 5 parts FEP, 1 part TFE and 2 parts of distilled water, all parts being by volume. Once formed, the solution has been found to be very stable having substantially an indefinite life as long as air is excluded.

The following steps are recommended to produce a storage bulb in accordance with the present invention:

1. Clean bulb internal surface. This can be accomplished by introducing concentrated nitric acid into the bulb and boiling the acid for a short period of time in the bulb. Then, the nitric acid is drained and the bulb is rinsed with distilled water.

2. Coat the bulb surface with a solution containing both TFE and FEP particles. As is known, the particles are commercially available as aqueous dispersions containing a wetting agent such as alkyl phenoxy polyethoxy ethanol. The solution is formed by mixing appropriate quantities of the dispersions containing TFE and FEP with distilled water. Then the solution is poured slowly into the bulb which is rotated so as to coat its internal surface with the solution without producing any bubbles.

3. Drain the bulb excess solution.

4. Dry the bulb to remove the water from the solution in the bulb. Bulb drying can be accomplished by introducing dry air, preferably at a uniform rate, e.g., 1 liter/min., for a period depending on the bulb's surface area. After the bulb is dried, the remaining solution consists primarily of TFE and FEP particles and the wetting agents.

5. Cure solution in bulb. This is done by placing the bulb in an appropriate curing oven whose temperature is controlled. In one application curing was achieved by placing the bulb in a block body radiator which was in turn placed in an oven. The bulb was cured at a temperature of not less than 380°C for about 30 minutes. As previously pointed out, the wetting agents evaporate during the curing step.

It should be pointed out that many of the steps here-before referred to may be similar to steps performed in the prior art in coating a storage bulb with either TFE, FEP or other particles. The primary novelty of the present invention is based on providing a storage bulb coated with a thin film which includes TFE as well as FEP particles, rather than only one type of these particles. Such a film has surface properties which are greatly superior to those provided by films of either TFE or FEP particles. Furthermore, the novelty of the invention is based on the method of providing a solution containing both TFE and FEP particles and using it to coat a storage bulb, resulting in unexpected superior performance of the maser in which the bulb is incorporated.

Attention is now directed to the drawing wherein numeral 10 designates a storage bulb in cross-sectional view. Its internal surface 12 is shown coated by a thin film 14 which in accordance to the present invention includes both TFE and FEP particles. It is the combination of these particles in film 14 which provides the latter with a highly uniform surface 15 which is free of any imperfections, which are present in surfaces of films containing only either TFE or FEP particles but not both types of particles. In the drawing, numeral 16 designates the bulb's port and numeral 18 designates a bulb stem which is generally used to align the bulb in the maser.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. In an atomic hydrogen maser of the type including a storage bulb having an internal surface, the improvement comprising:

a thin film coating said internal surface for providing a highly uniform smooth crazing-resistant surface and substantially free of pinholes, said film consisting essentially of tetrafluoroethylene resin, and hexafluoropropylene-tetrafluoroethylene copolymer resin.

2. In the method of producing a storage bulb having an internal surface for use in an atomic hydrogen maser, the steps comprising:

providing an emulsion containing a first amount of particles of tetrafluoroethylene resin in an aqueous dispersion, definable as TFE, a second amount of particles of hexafluoropropylene-tetrafluoroethylene copolymer resin in an aqueous dispersion, definable as FEP, and a third amount of distilled water;

coating the internal surface of said bulb with said emulsion to form a thin film of emulsion on said internal surface;

drying the thin film of emulsion on the internal surface of said bulb to remove the water and other aqueous matter therefrom; and curing the emulsion remaining on the internal surface of said bulb by uniformly heating the bulb and the remaining emulsion thereon to a temperature of at least 380°C.

* * * * *